Figure 1:
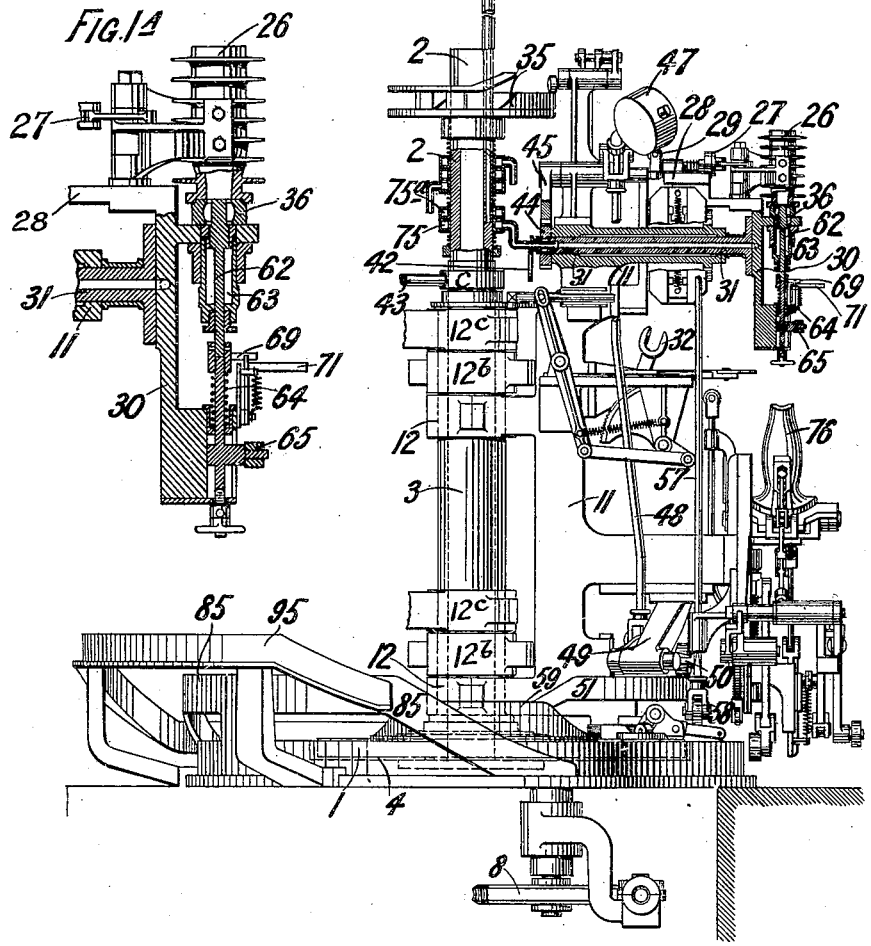

T. W. SIMPSON.
MACHINE FOR THE MANUFACTURE OF GLASS BOTTLES.
APPLICATION FILED MAR. 19, 1910.

978,228.

Patented Dec. 13, 1910.
7 SHEETS—SHEET 3.

Witnesses

Inventor
Thomas William Simpson
Attorney

T. W. SIMPSON.
MACHINE FOR THE MANUFACTURE OF GLASS BOTTLES.
APPLICATION FILED MAR. 19, 1910.
978,228.
Patented Dec. 13, 1910.
7 SHEETS—SHEET 4.
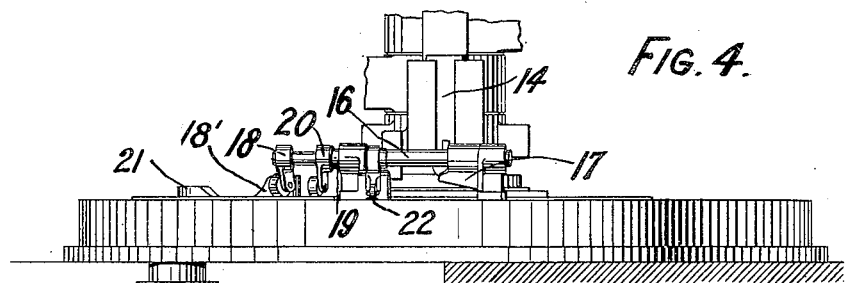
FIG. 4.
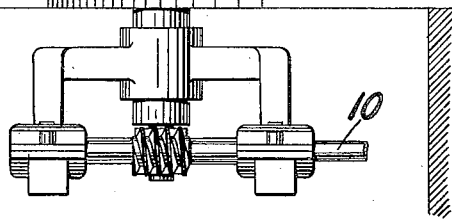
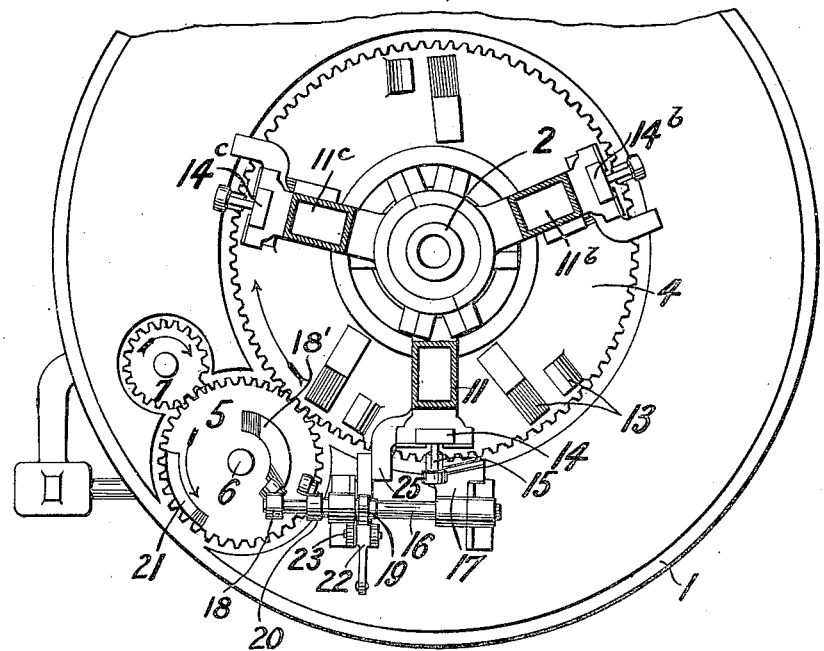
FIG. 5.
Witnesses
Inventor
Thomas William Simpson
Attorney T. W. SIMPSON.
MACHINE FOR THE MANUFACTURE OF GLASS BOTTLES.
APPLICATION FILED MAR. 19, 1910.

978,228.

Patented Dec. 13, 1910.

7 SHEETS—SHEET 5.

Witnesses

Inventor
Thomas William Simpson

Attorney

T. W. SIMPSON.
MACHINE FOR THE MANUFACTURE OF GLASS BOTTLES.
APPLICATION FILED MAR. 19, 1910.
978,228.
Patented Dec. 13, 1910.
7 SHEETS—SHEET 6.
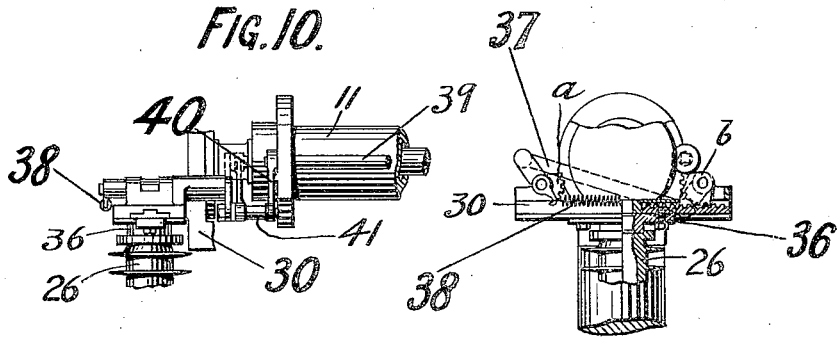
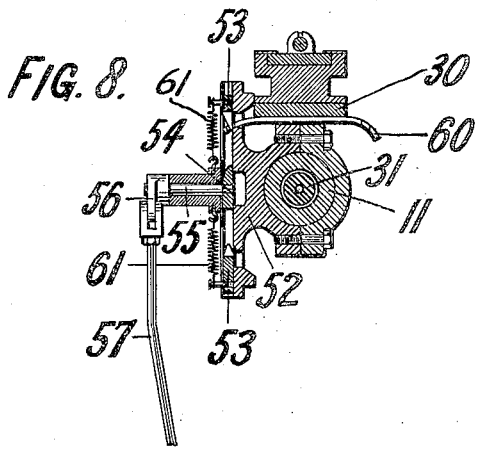
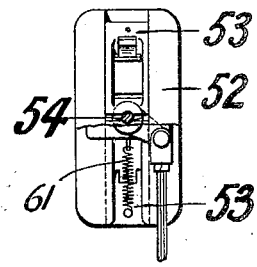
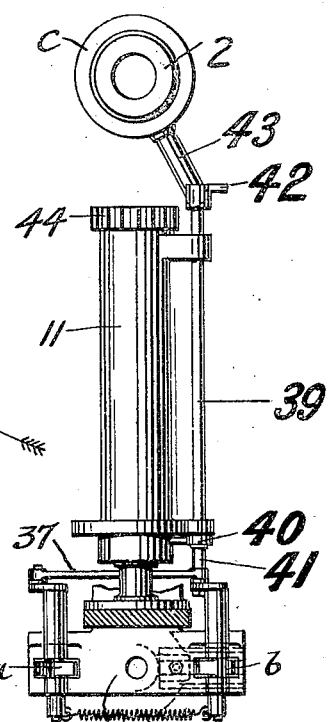
Witnesses
Inventor
Thomas William Simpson
Attorney T. W. SIMPSON.
MACHINE FOR THE MANUFACTURE OF GLASS BOTTLES.
APPLICATION FILED MAR. 19, 1910.
978,228.
Patented Dec. 13, 1910.
7 SHEETS—SHEET 7.
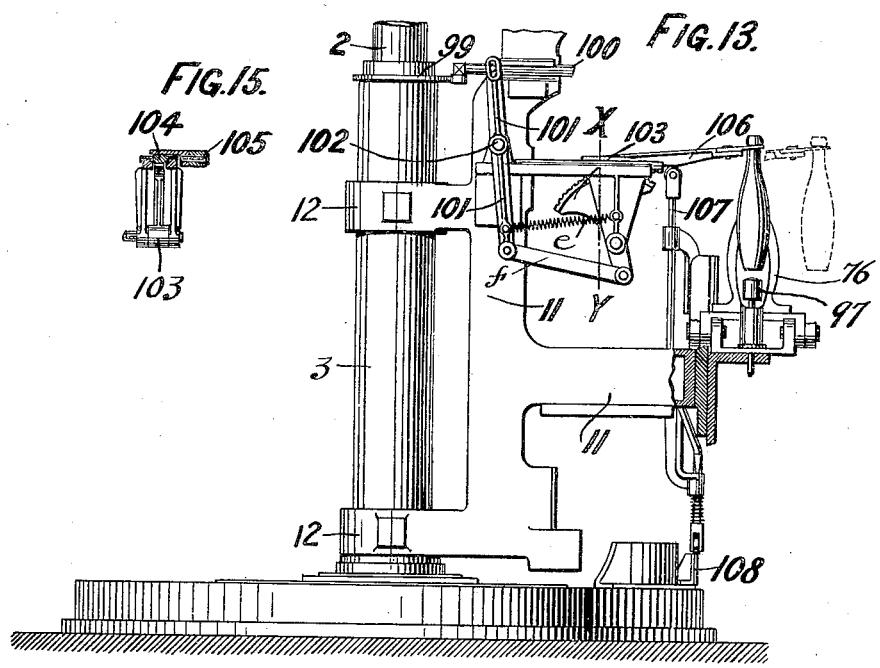
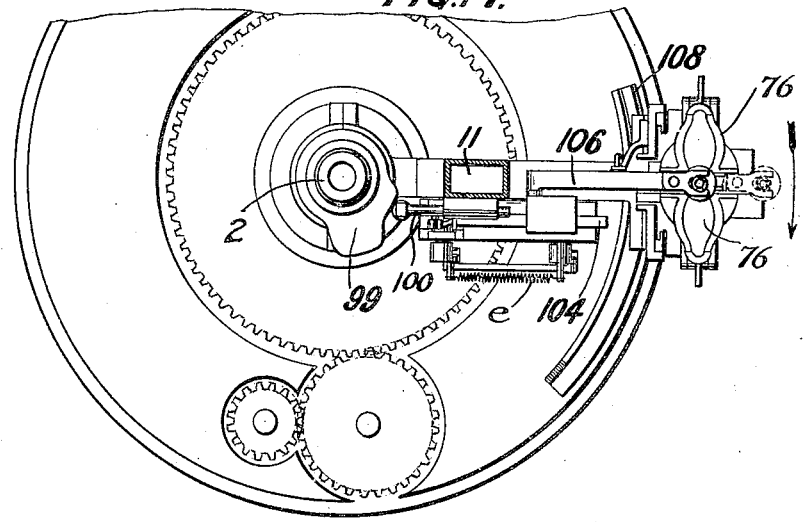

UNITED STATES PATENT OFFICE.

THOMAS WILLIAM SIMPSON, OF CASTLEFORD, ENGLAND.

MACHINE FOR THE MANUFACTURE OF GLASS BOTTLES.

978,228.   Specification of Letters Patent.   Patented Dec. 13, 1910.

Application filed March 19, 1910. Serial No. 550,541.

*To all whom it may concern:*

Be it known that I, THOMAS WILLIAM SIMPSON, a subject of the King of Great Britain, residing at Castleford, in the county of York, England, have invented certain new and useful Improvements in or Connected with Machines for the Manufacture of Glass Bottles, and of which the following is a specification.

Several types of machines for the mechanical manufacture of glass bottles are well known in which the bottle-forming mechanisms were carried about a vertical axis. In one of these known types of machines a revolving frame was employed carrying a series of blank molds and blowing molds, but such frame was not only revolved but reciprocated vertically parallel with the axis about which it rotated in order to dip the lower edges of each blank mold into molten glass for the purpose of obtaining a supply thereof. In another type of such rotary machines such as described in the specification of my United States Patent No. 933,590, the frame, revoluble about a vertical axis, was so revolved with a step-by-step motion and did not have any such reciprocating vertical motion, and this latter step-by-step revoluble frame carried reversible or turn-over parison molds and also carried for each parison mold a vertically movable finishing mold, while means were provided by which, during one revolution effected through such step-by-step motions, the requisite movements were mechanically given to each set of bottle making devices to produce a complete bottle, so that the machine only required an attendant to charge the parison mold with molten glass at the starting station and an attendant to remove the finished bottle at the final stopping station.

Now the present invention relates to an improved machine for the manufacture of glass bottles, which is of that type in which several sets of turn-over mechanisms carrying parison molds and finishing molds are mounted upon one apparatus and having rotary motion around a vertical column, but which do not have vertical reciprocating motions thereon. In such a known machine pauses between the step-by-step motions constituted unnecessary periods of rest for some of the sets of bottle-forming mechanisms carried by the revolving framework, in order to permit of the gathering operation being carried out at one of the sets or sections of bottle-forming mechanisms, that is to say, to allow of the parison mold of each set of mechanism, as it arrived at its proper station, being given its supply of molten glass, and thereby the time occupied by a section or set of such bottle-forming mechanisms from the starting station to its return to the starting station was not utilized to the best advantage; now, in the machine which is the subject of the present invention each set of bottle-forming mechanisms—or each "section" of the machine, as it may be termed,—is caused, as before, to pass through its various movements during one revolution, and the primary object of the present invention is to utilize the time which each section takes to effect a complete revolution, to the very best advantage, and to provide that the delay which one section after another must have at one part of the revolution for the replenishing of the parison mold, shall not cause the simultaneous stoppage and consequent delay of any other section of the machine, and thereby the manufacturing processes can be carried out more gradually than has been hitherto possible without excessive slowness of manufacture.

A further object of the invention is to improve and simplify the mechanical operation of the mechanisms.

According to this invention I provide, as heretofore, a vertical stationary central column upon which is a sleeve, which according to this invention receives a constant revolving motion; I then provide a plurality of sets or sections of bottle-forming mechanisms, each section consisting of a framework carrying at its upper part a turn-over parison mold, neck mold, and blowing plunger, and mechanism through which motion is given to these elements, while below on the framework of each section there is supported a hinged finishing mold and mechanism through which it receives its requisite motions. The frame of each section is carried by the constantly revolving sleeve, but is capable of being either attached thereto when it is required to accompany the motion of the said sleeve, or released therefrom when the section is required to become stationary. There is only one period during which a section of such a glass-bottle-making machine is required to remain stationary, and that is during the insertion of the molten glass into the parison mold, and upon the arrival of a section at that point in its circular travel at which this operation is to be effected, that particular section is released by mechanism, such as hereafter described, from the revolving sleeve and locked while the remaining sections are still in revolving motion. The operation (known as gathering) having been effected upon the stationary section, that section is again locked to the constantly revolving portion of the machine but not in the same angular relation to its adjacent sections, and then the next section arriving at the gathering position is in its turn released from the revolving part of the machine, remains stationary during the gathering, and is again, upon the completion of this operation, locked to the revolving part of the machine likewise in a different angular position in relation to the adjacent sections, and so on, and thus supposing there to be three sections of bottle-forming mechanisms, there will be five points or stations on the rotary portion of the machine at which the sections can be locked thereto. I would have it understood, however, that the application of the invention is not limited to a machine carrying three sections of mechanism having five locking stations on the rotary part, because two sections of mechanism might be employed with three locking stations, or four sections with seven, or five with nine, the rule being that double the number of locking stations on the rotary portion of the machine less one are required to the number of sections which the machine carries.

The improved mechanism by which this invention can be carried into effect, as well as the construction of the blowing plunger and its parts, will be more readily understood by describing the same with reference to the accompanying drawings, whereon is shown a constructional example of the complete machine as above outlined.

Figure 2:
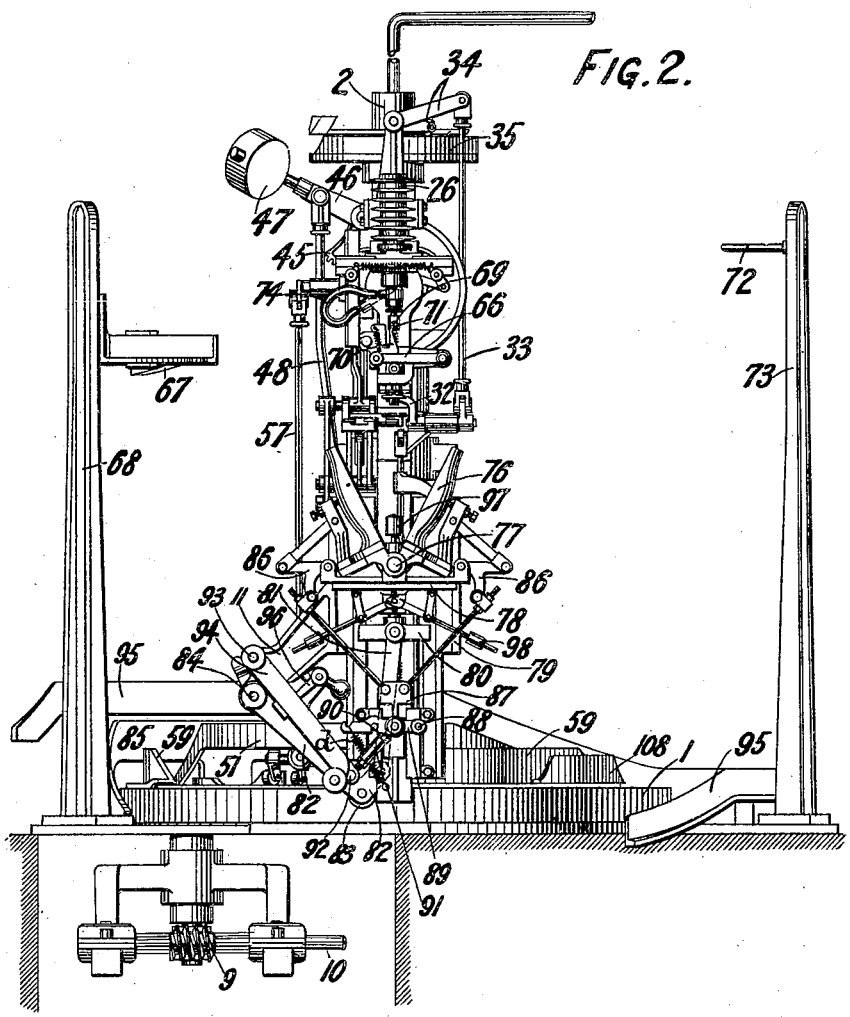
Figure 3:
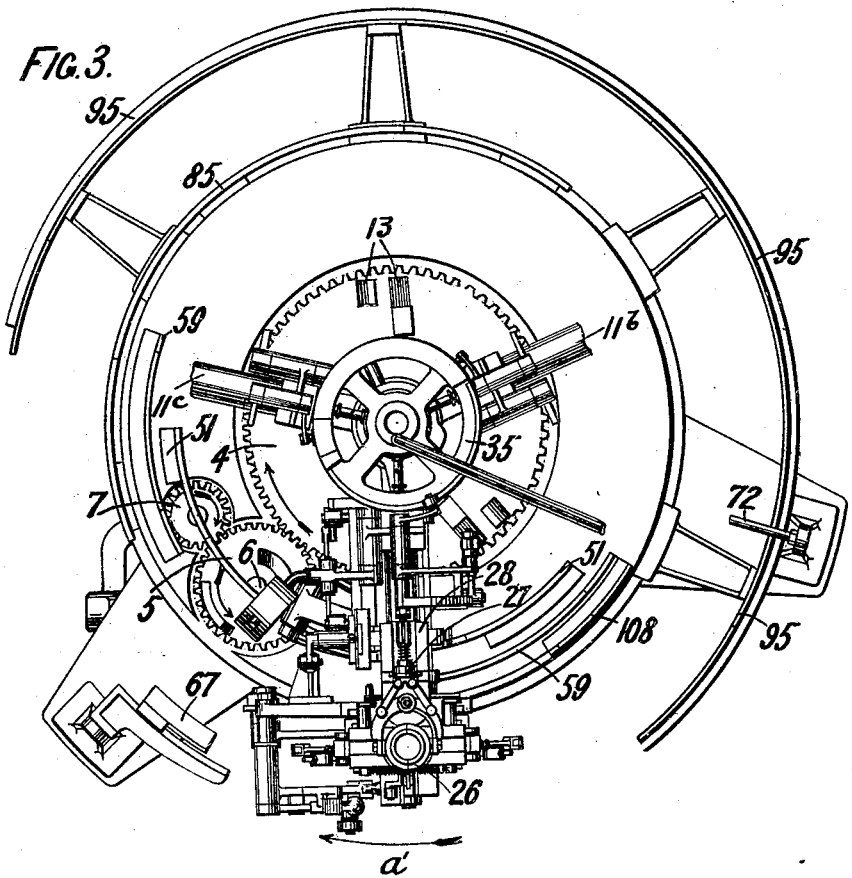
Figure 6:
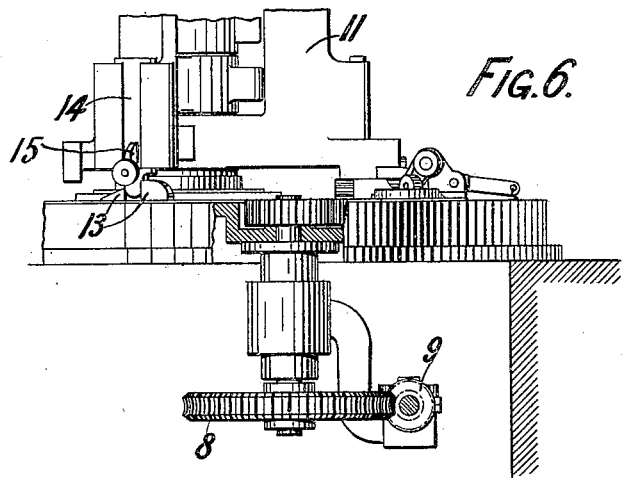
Figure 7:
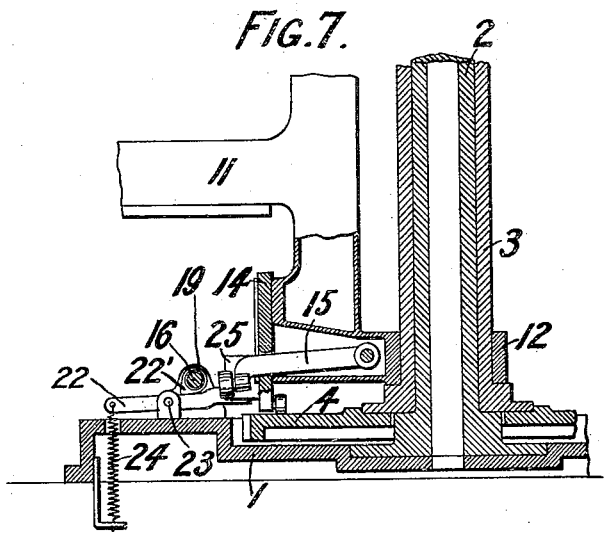

Figure 1 is a sectional side elevation of a machine according to this invention, one only of the "sections" being illustrated in the position in which that section is temporarily stationary, and Fig. 1ᴬ is an enlarged sectional elevation of a portion of the mechanism shown at Fig. 1, and is particularly intended to illustrate the plunger by which the blowing operations are effected and controlled. Fig. 2 is a front elevation, and Fig. 3 is a plan view of the same machine. Fig. 4 is a front elevation of the lower portion of the machine intended to particularly illustrate the locking mechanism for the sections of the machine, and Fig. 5 is a part sectional plan of the same. Fig. 6 is a side sectional elevation of the parts shown at Fig. 5 looking from the left, and Fig. 7 is a sectional elevation to further illustrate the locking mechanism of the sections. Figs. 8 and 9 illustrate in detached views the means for locking and releasing the turn-over head carrying the parison mold; Fig. 8 being a section taken at right angles to the tubular shaft carrying the said parison mold head, and Fig. 9 being a side elevation of some of the parts shown at Fig. 8 looking from the left. Figs. 10, 11 and 12 illustrate a suitable means for operating the two sliding members which compose the neck mold; Fig. 10 being a side elevation, Fig. 11 a sectional front elevation and Fig. 12 a sectional plan view of these parts detached. Figs. 13, 14 and 15 segregate means whereby the finished bottle is mechanically taken from the finishing mold and presented for removal; Fig. 13 being a sectional elevation illustrating a section of the machine in the position in which this operation takes place, Fig. 14 a sectional plan view of the parts shown at Fig. 13, and Fig. 15 a section taken at about the line X Y of Fig. 13.

Referring to the drawings, the bed plate 1 of the machine carries the vertical stationary central column 2 (Fig. 7) around which is located the constantly revolving sleeve 3 formed or fitted at its base with a toothed disk 4 with the peripheral teeth of which a toothed wheel 5 gears (see Fig. 5) the said toothed wheel being mounted upon a stud axle 6 on the base-plate and driven by a pinion 7 (Fig. 5) mounted upon a shaft extending below the base-plate and carrying a worm wheel 8 driven by a worm 9 (Fig. 6) on a shaft 10 (Fig. 4) which is revolved by any convenient power.

Supported from the sleeve 3 are the several sections of the machine, each section consisting as before stated, of a movable frame carrying its own complete bottle-forming mechanisms, and since all the sections are similar to one another it will be sufficient to describe one of such sections, which section is shown as a whole in sectional side elevation at Fig. 1, in plan at Fig. 3, and in front elevation at Fig. 2. The frame 11 of this section is formed with collars 12 (Fig. 1) which surround the sleeve 3 and support the frame 11, although said collars are not fixed to the said sleeve but can be freely turned relatively thereto. Upon the upper face of the base disk 4 of the sleeve 3 there are formed five notches in order to suit the three bottle-forming sections with which this machine is fitted, and these notches are each formed, as is clearly shown at Figs. 5 and 6, by two upstanding parts or projections 13, one of which parts presents an upper inclined surface, that is to say inclining in the direction of rotation of the disk 4. See Fig. 6. Said frame 11 carries a vertically movable bolt 14 (Figs. 4–7) working in suitable guides in the frame and carrying at its lower end a roller which runs freely upon the disk 4, and normally supports the bolt from contact with the surface of the disk. The bolt 14 is intended to descend to its locking and to its normal position by gravity, but is lifted from its locking position, that is from the position in which its lower end becomes located in one of the notches between the projections 13 on the disk 4, by means of a pivoted lever 15 (Fig. 7), the free end of which passes through an aperture in the bolt and is fitted with a roller.

A rock-shaft 16 (Figs. 4, 5 and 7) is carried in bearings on the base 1 of the machine. This rock-shaft carries a plate or arm 17, the angular position of which is governed by means of an arm 18 (Figs. 4 and 5), carrying a roller arranged to bear upon the surface of the gear wheel 5 (Fig. 5), which is formed with a cam surface 18′ so that at proper times, as hereafter stated, the shaft 16 is rocked and the arm 17 caused to lift the lever 15 (Fig. 7) and withdraw the bolt 14 from between the adjoining projections 13 of the disk 4. It will now be observed that just before the said section arrives at the position shown at Figs. 3 and 5, its bolt 14 will be mechanically lifted from the notch of one set of the projections 13, and should then pause. To insure this rest immediately taking place, a sleeve 19 (Figs. 4, 5 and 7) is mounted upon the shaft 16, which sleeve is capable of being angularly rocked about the shaft 16 by means of an arm 20 (Fig. 4) carrying a roller with which a cam surface 21 on the gear wheel 5 contacts. The rocking motion of the sleeve 19, thus produced, actuates an intercepter lever 22 by means of a cam 22′ (Fig. 7) mounted on the said sleeve 19. The intercepter lever 22 is pivoted at 23, and its inner end is normally held raised by a spring 24 (Fig. 7) acting on its outer end.

Immediately after the bolt 14 has been raised to release the section, the forward end of the intercepter lever 22—which is normally in a raised position and standing in the path of a projection 25 on the section frame 11 (Figs. 5 and 7)—stops the further angular motion of the said section 11. The bolt 14 is then allowed to descend by the action of the cam 18′ on the gear wheel 5 operating the shaft 16, and upon the arrival of the next set of projections 13 of the revolving disk 4, the forward incline of such projections acts on the roller of the bolt 14, lifts the bolt, and permits the said bolt to fall by gravity in the notch of that set of projections 13. Simultaneous with this action the sleeve 19 is rocked by the cam 21 (Fig. 5), and thereby the forward end of the intercepter lever 22 is depressed and placed in a position in which it is clear of the projection 25 of the frame 11, and consequently permits the frame to continue on its circular travel along with the disk 4 and the sleeve 3.

The upper end of the frame 11 carries a parison mold 26 (Figs. 1, 1ᴬ and 2) composed of two halves as is common, hinged together on a vertical axis, the arms of the hinges being connected to a sliding head 27 mounted in guides 28 on the frame, a spindle extension of the sliding head carrying a roller 29, and when the parison head 30 is turned about its tubular shaft 31—which is carried in bearings in the frame 11—the roller 29 enters the mouth of a pivoted fork 32 (Fig. 1 and see also Fig. 2), which is rocked by means of a connecting rod 33 (Fig. 2) through the medium of a double-armed lever 34, one arm of which carries a roller actuated by means of a stationary angular cam surface 35 which is supported from the upper end of the stationary column 2.

The neck mold 36 (Figs. 1, 1ᴬ) is of that well known description which consists of two portions mounted in guides, which portions are separated to release the bottle neck in due course.

The mechanism by which the halves of the neck mold 36 are controlled as to their position, does not form an essential portion of this invention, but in order to render the entire construction clear I have illustrated means for operating the neck mold at Figs. 10 to 12. As there shown, each half of the neck mold 36 is formed with a rack, and slides in guides in the parison head 30, and gearing with the said racks are two sectors $a$ and $b$ (Figs. 11 and 12), each mounted upon a shaft carried in bearings in the said parison head 30, and upon each sector shaft there is a crank arm, the ends of the crank arms being connected by a connecting rod 37; beyond this, there is a spring 38 tending to draw the two halves of the neck mold together. It will be obvious that mechanical operation is only needed when the halves of the neck mold are to be separated, and to this end I provide a shaft 39 (Fig. 12) carried in bearings on the frame 11. The outer end of the shaft 39 carries an arm 40 (Fig. 10) which is adapted to contact with a roller or pin 41 carried at the end of the crank arm, which latter is mounted on the shaft carrying one of the toothed segments before mentioned. The opposite end of the shaft 39 is fitted with an arm 42, which as the section of the machine travels around, contacts with a roller 43 carried by a collar $c$ (Figs. 1 and 12) which is fixed upon the column 2 and is therefore stationary. When the arm 42 upon the shaft 39 therefore contacts with this roller, the shafts carrying the toothed sectors $a$ and $b$ (Fig. 11) will be rocked in opposite directions, and the two halves of the neck mold will be separated to release the neck of the bottle, and immediately the shaft 39 is released, the halves of the neck mold will close together.

Mechanism is provided as usual for turning the parison head 30, and in the construction shown for this purpose, the tubular shaft 31 (Fig. 1) is fitted with a toothed pinion 44 operated by a toothed segment 45 upon the shaft of which is fitted an arm 46 (Fig. 2) carrying a balance weight 47, said arm 46 having a connecting rod 48 extending downwardly and pivoted at its lower end to one arm of a lever carried by a bracket 49 from the section frame 11, the shaft of said lever having at its opposite end another arm 50 carrying a roller, which as the section frame 11 revolves, comes on to a stationary raised cam surface 51, which moves upwardly the connecting rod 48 and causes the parison head 30 to effect half a revolution in a counter-clockwise direction, and to thereby invert the parison mold; the office of the counter-weight 47 is to bring the parts back to the position shown at Figs. 1 and 2, when the roller of the arm 50 is released from the stationary cam 51, which is fitted on the base-plate of the machine.

Means are provided for locking and unlocking the parison head 30, as has been heretofore proposed in such machines, and to this end, referring to Figs. 8 and 9, a bracket 52 is fixed on the frame 11, said bracket having a vertical face carrying in guides two loop-shaped sliding members 53, between the adjacent ends of which there is a rocking blade 54 carried on a spindle 55 in a bearing sleeve formed with the bracket 52. And the spindle 55 is capable of being rocked by an arm 56 through the medium of a rod 57 extending downward and carrying upon its lower end a roller 58 (Fig. 1), which as the section is carried around in the direction of the arrow a' (Fig. 3) clockwise, contacts at times with stationary cam surfaces 59 on the bed-plate of the machine. By these cam surfaces the rod 57 is lifted, the blade 54 rocked, the sliding members 53 distanced apart, and while so distanced, the semi-revolution of the parison-carrying head 30 brings one end of a tongue 60 carried by the parison head 30 into the loop of one of the sliding members 53. Within the outer end of the loop each member 53 is formed with a tooth, and as the sliding members 53 are permitted to approach each other (which is facilitated by the action of springs 61) the said tooth of the member 53 engages a notch in that end of the tongue 60 which has entered the loop of the said member, and consequently the parison-carrying head becomes locked in position.

In the machine now described I employ an improved construction of plunger 62 which is shown at Fig. 1, but is also shown drawn to a larger scale at Fig. 1ᴬ. This vertically movable plunger 62 consists of a solid plug having a somewhat tapered or reduced point which is shown in the drawings as projecting into the neck mold 36, and it will be obvious that when the parison mold 26 is supplied with glass, that the molten glass will run into the neck mold around the reduced end of the said plug 62.

Below the neck mold 36, as shown at Fig. 1ᴬ, the larger diameter of the plunger 62 fits a bearing formed in the parison head 30, and below that bearing the plunger is again reduced in diameter and passes through a cylindrical chamber 63 carried by the head 30 and extends through a gland at the lower end of the said chamber 63 and is fitted with a spring 64 tending to keep the plunger in the position shown in the drawings.

Upon the plunger 62 is a projecting roller 65 which extends into the fork of a lever 66 (Fig. 2); and the free end of the latter lever carries a roller, which as the section revolves, passes beneath a stationary cam track 67 (Fig. 2) supported upon a pillar 68, and thereby the plunger 62 is drawn down against the action of its spring, so that its enlarged upper portion is brought clear of its bearing and pressure air can then pass from the chamber 63 around the forward end of the plug to the neck of the parison, while the air so passing has a considerable cooling effect on the plug. As soon as the plunger 62 is thus brought down by the action of the stationary cam 67, a pin 69 projecting from the plunger 62 snaps beneath the hook of a spring-retained catch 70 (Fig. 2) whereby the plunger is held in its lower position.

Projecting from the hooked end of the catch 70 is a longer pin 71 (Fig. 1ᴬ), and the office of this pin 71 is to contact with a stationary arm 72 (Fig. 2) supported on a standard 73, at a time when the parison mold is inverted, and thereby the catch 70 is caused to release the pin 69, and the plunger can then be impelled by its spring 64 again into the neck mold to the position in which it is shown at Fig. 1ᴬ.

The air supply to the air chamber 63 (Fig. 1) passes through the central bore of the tubular shaft 31 of the parison head and from the end of that bore is conveyed to the said chamber 63 by a flexible pipe 74 (Fig. 2), and the bore of the shaft 31 receives its air supply from a collar 75 (Fig. 1) having an annular bore and loosely mounted upon the column 2; the upper face of the collar 75 is formed with the requisite perforations, which communicate at proper times with perforations in a similar annular collar 75ᵃ in contact with the collar 75, but fixed on the stationary column 2. It will be understood that there is such a combination of air supply collars for each section of the machine, and the air supply to the stationary collar of each combination passes down by a passage in the column 2 from any convenient source of supply of pressure air.

The finishing mold 76 is constructed in two halves and hinged together at 77 (Fig. 2) to a carrying plate 78 sliding in vertical guides 79 formed on the section frame 11, the said finishing mold being raised bodily when it is required to close over the parison which hangs from the neck mold, when the parison head has been inverted and the parison mold 26 has been opened. In order to carry out this vertical motion according to the present invention, the carrying plate 78 is supported by a sliding cross head 80 from which a connecting rod 81 extends, its lower end being pivoted to one end of a bent lever 82 which carries a roller 83 (Fig. 2), and is pivoted at 84 to an extension of the frame 11. As the section frame 11 is revolved the roller 83 passes on to a raised cam surface 85 mounted on the stationary base-plate 1 of the machine, and thereby the lever 82 is rocked and the finishing mold 76 raised, and upon the roller 83 leaving the cam 85 the finishing mold descends by gravity.

The mechanism for opening and closing the halves of the finishing mold 76 consists of levers 86 (Fig. 2) pivoted on the carrying plate 78, connected by connecting rods to the halves of the said mold, and also by other connecting rods to a slide 87 movable in guides formed in the section frame 11. The slide 87 is formed with lateral extensions one of which carries a pivot 88 (Fig. 2) upon which is a lever 89, and the other extension of the slide 87 carries a pin 90 over which a slot in the lever 89 passes, and the free end of the lever 89 is held down on to the pin 90 by means of a spring $d$ (Fig. 2) extending between the free end of the lever 89 and the slide 87. A connecting rod 91 extends between the lever 89 and the free end of a lever 92, pivoted freely on a pivot 93, which latter pivot also receives a lever 94, carrying at its free end a roller, which, as the section frame 11 revolves co-acts with a raised cam surface 95 (Fig. 1) carried from the base-plate 1 of the machine.

The lever 92 is normally locked to the lever 94 by means of a rocking bolt 96, pivoted on an extension of the lever 92, the bolt being provided with a weighted handle as shown at Fig. 2. With this mechanism, when the free end of the lever 94 is lifted by the cam surface 95, it exerts an upward lift on the lever 89 which is carried by the slide 87, and therefore, since the lever 89 is resiliently held at one of its ends, the slide 87 receives a resilient lift so that the perfect closure of the halves of the finishing mold 76 is thus obtained, and any irregularities in the motion or shape of the cam surfaces 95 are thereby allowed for.

The mechanism for closing the finishing mold may be thrown out of action during motion, and without stopping the machine as a whole, in order to permit of broken glass or other obstruction being removed, and this is easily effected by tilting the rocking bolt 96 by means of its handle from the position shown at Fig. 2 whereby although the lever 94 is caused to turn about its pivot 93, the lever 92 will not follow this motion, so long as the rocking bolt 96 is not locking the two parts together.

The finishing mold is shown as provided with a balanced paddle or base 97 which I have heretofore proposed in bottle-making machinery, and which is upheld by the gravity action of weighted levers 98. I further provide each section of the machine with a mechanical device by which the finished bottle, just before the opening of the finishing mold 76, can be seized by its neck and upon the finishing mold opening can thereby be lifted with a vertical motion and moved forwardly to be presented to an attendant for removal. The mechanism for effecting this is more particularly shown by Figs. 13, 14 and 15 of the drawings to which I will now refer. I provide a stationary cam 99 fixed on the column 2, and as the section frame 11 revolves, the said cam acts upon a roller carried by a slide rod 100, mounted in guides in the said frame 11. The slide rod 100 operates one end of a two-armed lever 101 pivoted at 102 to the frame 11, or to an extension thereof, and this lever is held so that the slide 100 bears against the cam 99 by means of a spring $e$ shown at Fig. 13 and Fig. 14. The lower end of the lever 101 by a connecting rod $f$ is adapted to rock a toothed sector 103 gearing with a rack on a slide 104, Fig. 15, and this slide carries a hinge pin 105 supporting one end of an arm 106, the forward end of which is constructed with a fork adapted to pass on each side of the neck of the bottle. The under-face of the arm 106 is formed with an inclined surface with which there contacts a roller carried at the upper end of a vertically movable rod 107 carried in guides on the section frame 11, and the lower end of the rod 107 is fitted with a roller, which during the revolution of the frame 11 travels on to a raised cam surface 108, compare Fig. 2 and Fig. 3. The cams 108 and 99 are so positioned that the arm 106, at the proper time, makes its forward movement so that its end fork passes on each side of the neck of the bottle, and then the vertical movable rod 107 is lifted by the action of the cam 108, and the bottle passes forwardly for removal into the position shown by dotted lines at Fig. 13 and Fig. 14.

The various mechanical elements of the machine having been now described in some considerable detail, I will briefly state the cycle of the automatic operations from the time when the parison mold is supplied with molten glass, to that point when a finished bottle is mechanically delivered to the attendant, taking for this purpose the history of the motions of that particular revoluble section of the machine which is shown as a whole at Figs. 1, 2 and 3, as aforesaid, the remaining sections effecting the like operations in consecutive order. The second and third sections are represented by their supporting collars (12$^b$ and 12$^c$) at Fig. 1, by their frames (11$^b$ and 11$^c$) at Figs. 3 and 5, and by their bolts (14$^b$ and 14$^c$) at Fig. 5. The bottle-forming mechanism carried by the section frame 11 of the machine (Figs. 1, 2 and 3) is there shown in the position at which an attendant is stationed who supplies the parison mold 26 with a charge of molten glass. In this position the vertically movable bolt 14 is resting, by means of its roller, upon the revolving disk 4 (Fig. 7) of the sleeve 3, which latter sleeve is revolving, it being in constant rotation while the frame 11 (now being dealt with) is prevented from following the revolving motion by means of the intercepter lever 22 (Figs. 5 and 7).

The wedge-like forward end of one of the pairs of projections 13 (Figs. 5 and 6) on the disk 4 next following the pair of projections from which the frame 11 (now being dealt with) was last released, passes beneath the roller of the locking bolt 14 and raises that bolt, and at about the moment that the said bolt falls between the projections 13, the inner end of the intercepter lever 22 is lowered by the action of the cam 21 (Figs. 4 and 5), and this particular frame 11 commences its revolution, accompanying the sleeve 3 and the disk 4, and this continuous rotary motion of the said frame will not cease until it again arrives at the one stopping station from which it has started, and at which, as aforesaid, the parison mold is replenished with another charge of molten glass. Obviously, at the moment that the section frame 11 (now being dealt with) becomes engaged through its locking bolt 14 with this particular set of projections 13 which cause it to start on a new travel, its distance from that section frame (11$^b$) which is next to follow it, is less than the distance between the frame 11 now being dealt with and that frame (11$^c$) which has started previously; and so on at each pause of a frame for a replenishment with molten glass, the angular distances between the frames becomes changed, but at the same time there is no period of rest and consequently no loss of time in manufacture, with the result that the mechanical parts do not rest at one time and entail the necessity of movements of greater velocity to make up that time so lost, as has occurred in machines of this rotary type heretofore. The motions of the particular section that has been specially dealt with, will now be briefly followed through the rotary travel of that section. After its travel has commenced the forked arm 106 (Fig. 13) by which the bottle was removed from the finishing mold, 76, during the preceding revolution of this section, is withdrawn inward so as to be out of the way, this being permitted by the stationary cam 99 (Fig. 14). The plunger 62 (Fig. 1$^A$) which has been projecting into the neck mold 36 as shown, is next withdrawn by the contacting end of the lever 66 (Fig. 2) being operated through the medium of the stationary cam 67, supported by the standard 68. Immediately the plunger is withdrawn, a supply of pressure air is admitted to the chamber 63 (Fig. 1$^A$) by means of the controlling valve formed by the collars 75 and 75$^a$ (Fig. 1) which are located about the column 2, and then the air supply is cut off. The device by which the tubular shaft 31 carrying the parison head 30 is held locked against rotation, is now released by means of the stationary cam 59 (Fig. 3) on the base-plate 1 acting upon the mechanism which I have very fully described with particular reference to Figs. 8 and 9, and immediately such release has been effected, the stationary cam 51 (Fig. 3) on the base-plate 1 acts through the medium of the rod 48 (Fig. 1), and through the medium of the toothed segment 45 and the pinion 44, turns over the parison head 30 about the axis of the shaft 31. As soon as the parison head has been so reversed, it is locked in position by the second portion of the cam surface 59 on the base-plate acting on the mechanism of Figs. 8 and 9. Immediately the parison head 30 has been so reversed, further apertures in the revolving air supply collar 75 (Fig. 1) come to coincide with similar apertures communicating with the annular space of the collar 75$^a$, and a further blowing operation is thus effected. At about the same time the parison mold 26 is opened by the mechanism described with reference to Figs. 1 and 2, operated by the stationary cam 35 carried by the column 2. The finishing mold 76 now has vertical motion of translation through the medium of the elevating mechanism described, particularly with reference to Fig. 2, the lever 82 being operated by the stationary cam 85 carried by the base-plate of the machine. The finishing mold 76 is at this time open, it having previously been opened for the removal of the finished bottle before the particular section now dealt with arrived at its single stopping station, and consequently the parison hanging from the neck mold can be received into the embrace of the finishing mold, which latter is now closed by the action of the opening mechanism described particularly with reference to Fig. 2 operated through the medium of the lever 94 and the stationary cam 95 carried from the base-plate.

The final blowing operation now takes place by a continued supply of pressure air being admitted to the chamber 63 (Fig. 1^A) by means of the air control collars 75, 75^a (Fig. 1) the formation of the bottle being thereby completed in the finishing mold 76. The separable parts forming the neck mold 36 are now separated, while the finishing mold 76 is still closed, the separation of the neck mold being effected by the mechanism which has been fully described as shown at Figs. 10 to 12 and which receive its movement by the arm 42 on the shaft 39 (Fig. 12) striking the projecting stationary arm or roller 43 projecting from the collar $c$ fixed on the stationary column 2 (Fig. 1). The finishing mold 76 is now permitted to descend by gravity by reason of the roller 83 on the lever 82 (Fig. 2) passing away from the raised portion of the cam surface 85, the section now being dealt with, nearly having reached the completion of its revolution. At about this time the longer pin 71 on the hooked catch 70 (Fig. 2) (it being remembered that the parison mold 26 is at this time inverted) strikes the stationary arm 72 on the standard 73 (Fig. 2), the plunger 62 (Fig. 1^A) is thereby released, and its spring 64 returns the plunger to the position shown at Fig. 1^A, the air supply to the chamber 63 having already been cut off. The forked arm 106 (Figs. 13 and 14) is now advanced by the cam 99 and other mechanism described as segregated by Figs. 13 and 14, in order that its fork may pass over the bottle neck to support the bottle, the finishing mold 76 being still closed, and at about this time the halves of the parison mold 26 are closed by the action of the cam 35, and the finishing mold is opened by the operation of the opening mechanism shown at Fig. 2 actuated through the medium of the arm 94 operated by the cam 95. The forked arm 106 now lifts the bottle clear of the bottom of the finishing mold 76 and carries the finished bottle forward to be taken away, it being presented as the frame still revolves to an attendant in the position indicated by dotted lines at Fig. 13 and Fig. 14. The parison head 30 is then unlocked and turned over to the filling position shown at Fig. 1, and the arm 17 (Figs. 4 and 5) on the shaft 16, operating through the lever 15 (Fig. 7) raises the locking bolt 14, and releases the frame 11 now being dealt with, from engagement with the projections 13 of the revolving disk, and the intercepter lever 22 is brought into position wherein it stands in the way of the projection 25 of the frame 11, and thereby prevents further rotation of that frame, until the next set of projections 13 arrive beneath the said frame. During the lapse of time between the release of the frame from one set of projections and the arrival of the next set of projections 13, the parison mold is again charged.

The entire cycle of operations of one section has been thus described, and each section performs precisely the same movements in rotation, and no section of a machine, according to this invention, whether there should be three sections as has been described in this specification, or whether more or less, makes any pause in its revolution about the central column, excepting at that one station where the parison mold is to receive its charge of glass.

What I claim as my invention and desire to secure by Patent is:—

1. In a machine for the manufacture of glass bottles, of that type in which several complete bottle-forming mechanisms are carried from and revolved around a vertical column each bottle-forming mechanism so carried being mechanically operated to produce a bottle during a single revolution; the combination of a plurality of movable frames each carrying a complete bottle-forming mechanism, a central vertical column around which said frames are intermittently revoluble, each frame being supported loosely and independently thereon, a constantly revolving member, means for disconnecting each frame from said constantly revolving member as each frame arrives at a common stopping station at which the parison mold of its bottle-forming mechanism is to receive its supply of molten glass, and again locking that frame after such operation to the revolving portion of the machine but not in the same angular relation to the adjacent frames, the next frame in its turn arriving at the stopping station being similarly released from the revolving member and held stationary during the supply of molten glass and being again locked to the revolving member likewise in a different angular position in relation to its adjacent frames, and so on, and means for operating the bottle-forming mechanism of each frame during its continuous revolving motion to effect the complete formation of a bottle.

2. In a machine for the manufacture of glass bottles, the combination with a plurality of independently movable frames, each carrying a bottle-forming mechanism, and a central vertical column around which each of said frames is intermittently revoluble, of a constantly revolving member provided with a number of locking stations double the number of said frames less one, and mechanically operated means by which each frame arriving at a predetermined point in each revolution is released from its locking station on the revolving member, permitted to be stationary until the arrival of the next locking station, and then locked to the latter and permitted to commence its next revolution.

3. In a machine for the manufacture of glass bottles, the combination with three independently movable frames, each carrying a bottle-forming mechanism, and a central vertical column around which each of said frames is intermittently revoluble, of a constantly revolving member provided with five locking stations, and mechanically operated means by which each frame arriving at a predetermined point in each revolution is released from its locking station on the revolving member, permitted to be stationary until the arrival of the next locking station, and then locked to the latter and permitted to commence its next revolution.

4. In a machine for the manufacture of glass bottles, the combination with a plurality of independenly movable frames, each carrying a bottle-forming mechanism and a central vertical column around which each of said frames is intermittently revoluble, of a constantly revolving member adapted to be locked to each of said frames, mechanically operated means for locking each frame from said revolving member as the frame arrives at a predetermined point in each revolution, an intercepting device adapted to definitely stop such frame, and means for releasing said frame from said intercepting device and for again locking said frame to said revolving member.

5. In a machine for the manufacture of glass bottles, the combination with a plurailty of independently movable frames, each carrying a bottle-forming mechanism, and a central vertical column around which each of said frames is intermittently revoluble, of a constantly revolving member including a horizontal disk carrying an annular series of notch-forming projections on its top concentric with said column, the leading projections forming lifting inclines, a notch-engaging bolt carried by each frame and adapted to interact with either of said inclines when not already locked, and with the adjoining notch, and mechanism adapted to lift said bolts in succession for unlocking said frames from said revolving member.

6. In a machine for the manufacture of glass bottles, the combination with a plurality of independently movable frames, each carrying a bottle-forming mechanism, and a central vertical column around which each of said frames is intermittently revoluble, of a constantly revolving member including a horizontal disk provided with an annular series of locking stations concentric with said column, a bolt carried by each frame adapted to interlock with either of said stations, a constantly revolving disk carrying two cams, mechanism interacting with one of said cams to lift said bolts in succession for unlocking said frames, a spring projected stopping device having a stationary support and arranged to interact with contiguous portions of said frames, and mechanism interacting with the other of said cams to retract said stopping device for permitting the successive frames to again revolve.

7. In a machine for the manufacture of glass bottles, the combination with a plurality of independently movable frames, each carrying a bottle-forming mechanism, and a central vertical column around which each of said frames is intermittently revoluble, of a constantly revolving member provided with an annular series of locking stations concentric with said column, a bolt carried by each frame adapted to lock said frame to said member at either of said stations and normally in its locking position, and means for unlocking said frames in succession including a constantly revolving horizontal disk geared to the first-named member and provided on its top with a cam, a lever arm adapted to interact with said cam, a longitudinal rock-shaft movable with said lever arm and which carries a second arm, and a lever pivoted to each frame, movable with the bolt of such frame and adapted to interact with said second arm.

8. In a machine for the manufacture of glass bottles, the combination with a plurality of independently movable frames each carrying a bottle-forming mechanism, and a central vertical column around which each of said frames is intermittently revoluble, of a constantly revolving member provided with an annular series of locking stations concentric with said column, a bolt carried by each frame adapted to lock said frame to said member at either of said stations and normally in locking position, means for unlocking said frames in succession, an intercepting lever normally in effective position for immediately stopping the unlocked frame, and means for releasing said frame to permit the same to again revolve, such releasing means consisting of a horizontal disk geared to the disk first named and provided on its top with a cam, a lever arm arranged to interact with said cam, and a rocking cam movable with said arm and arranged to interact with said intercepting lever.

9. In a machine for the manufacture of glass bottles, the combination with a stationary vertical column and a stationary base surrounding the same, of a continuously revolving disk adjacent to said base and concentric with said column having a superjacent sleeve through which said column extends, a plurality of mold-carrying frames adapted to revolve intermittently around said column and each provided with supporting collars loosely embracing said sleeve, and means for periodically locking each frame to said disk and for unlocking the same therefrom, such locking and unlocking means being carried in part by each frame and supported in part by said base and said disk respectively.

10. In a machine for the manufacture of glass bottles, the combination with stationary supporting means of a continuously revolving member, a plurality of intermittently revoluble frames each of which carries a complete set of bottle-forming devices, means for periodically locking each frame to said revolving member and for unlocking the same therefrom, and means for operating the bottle-forming devices of each frame so that a bottle is mechanically produced during one revolution of each frame.

11. In a machine for the manufacture of glass bottles, the combination with a stationary vertical column and base of a continuously revolving member, a plurality of intermittently revoluble frames each of which carries a complete set of bottle forming devices including a reversible parison mold and a rising and falling finishing mold, means for periodically locking each frame to said revolving member and for unlocking the same therefrom, and means for actuating said bottle-forming devices, such actuating means including cams supported by said column and base respectively.

12. In a machine for the manufacture of glass bottles, the combination with a stationary vertical column of a continuously revolving member concentric therewith, a plurality of frames intermittently revoluble around said column, and means for periodically locking each frame to said revolving member and unlocking the same therefrom; each of said frames being provided with a tubular horizontal shaft adapted to be supplied with pressure air, a reversible parison head mounted upon said shaft and having an air chamber in communication therewith, a parison mold carried by said head, a neck mold adjoining said parison mold and communicating therewith and a plunger bearing forming a communication between said neck mold and said air chamber, and an endwise movable plunger extending through said air chamber and having a tapered point adapted to enter said neck mold and enlarged portion adjoining said point and adapted to interact with said bearing to close the same when said point has entered said neck mold and to permit the passage of pressure air through said bearing when said plunger is withdrawn; and means for mechanically reversing such parison head, opening and closing each of such molds and operating such plunger of each frame while its revolution is being accomplished.

13. In a machine for the manufacture of glass bottles, the combination with stationary supporting means of a continuously revolving member, a plurality of intermittently revoluble frames each of which carries a reversible parison head including a parison mold a neck mold and a plunger together with a subjacent finishing mold and a vertically movable slide to which such finishing mold is attached, means for periodically locking each frame to said revolving member and for unlocking and stopping the same, and operating means including a stationary cam track and mechanism operated thereby for raising and lowering said slides successively, and a stationary cam track and mechanism operated thereby for opening and closing the successive finishing molds.

14. In a machine for the manufacture of glass bottles, the combination with a stationary vertical column and a stationary base surrounding the same, of a continuously revolving member concentric with said column, a plurality of frames intermittently revoluble around said column, each of said frames carrying a complete set of bottle-forming devices including a neck mold and a subjacent finishing mold, means for periodically locking each frame to said revolving member and for unlocking and stopping the same, means for operating the bottle-forming devices of each frame, including mechanism by which the finished bottle is released first from the neck mold and then from the finishing mold, and means for supporting the bottle within the opened finishing mold and for mechanically moving the same therefrom; such bottle supporting and moving means consisting of stationary cams supported by said column and said base respectively, mechanism operated by the column supported cam including a forked arm movable into engagement with the neck of the bottle and outward in the same direction, and a vertically movable lifting rod actuated by the base supported cam, substantially as herein specified.

15. In a machine for the manufacture of glass bottles substantially as claimed by claim 1; the construction and arrangement of the plunger carried by the parison head and the mechanism by which it is carried and operated.

In witness whereof I have hereunto set my hand in the presence of two witnesses.

THOMAS WILLIAM SIMPSON.

Witnesses:
 JOHN JOWETT,
 VANCE EWART GALLOWAY.